US011354320B2

(12) United States Patent
Yu et al.

(10) Patent No.: US 11,354,320 B2
(45) Date of Patent: *Jun. 7, 2022

(54) DETERMINING CAUSES OF EVENTS IN DATA

(71) Applicant: International Business Machines Corporation, Armonk, NY (US)

(72) Inventors: Jia Yu, Beijing (CN); Jia Tian Zhong, Beijing (CN); Xing Xing Shen, Beijing (CN); Zhan Peng Huo, Beijing (CN); Zhi Li Guan, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 256 days.

This patent is subject to a terminal disclaimer.

(21) Appl. No.: 16/157,831

(22) Filed: Oct. 11, 2018

(65) Prior Publication Data
US 2020/0117720 A1   Apr. 16, 2020

(51) Int. Cl.
*G06F 16/2457* (2019.01)
*G06F 16/248* (2019.01)
*G06F 16/22* (2019.01)
*G06N 7/00* (2006.01)

(52) U.S. Cl.
CPC .... *G06F 16/24578* (2019.01); *G06F 16/2228* (2019.01); *G06F 16/248* (2019.01); *G06N 7/005* (2013.01)

(58) Field of Classification Search
CPC .......... G06F 16/24578; G06F 16/2228; G06F 16/248

USPC ......................................................... 707/728
See application file for complete search history.

(56) References Cited

U.S. PATENT DOCUMENTS

| | | | | | |
|---|---|---|---|---|---|
| 5,463,768 | A | * | 10/1995 | Cuddihy | G06F 11/2205 714/37 |
| 5,493,729 | A | * | 2/1996 | Nigawara | G06N 5/04 706/52 |
| 5,572,424 | A | * | 11/1996 | Kellogg | G01M 15/102 701/33.7 |
| 5,701,400 | A | * | 12/1997 | Amado | G06N 5/02 706/45 |
| 5,828,778 | A | * | 10/1998 | Hagi | H01L 22/20 382/145 |
| 6,014,453 | A | * | 1/2000 | Sonoda | G06K 9/64 382/137 |

(Continued)

OTHER PUBLICATIONS

Yu et al., "Determing Causes of Events in Data," U.S. Appl. No. 16/507,136, filed Jul. 10, 2019, IBM Docket No. P201704990US02.

(Continued)

*Primary Examiner* — Tony Mahmoudi
*Assistant Examiner* — Michael Le
(74) *Attorney, Agent, or Firm* — Kelsey M. Skodje

(57) ABSTRACT

A method and system for determining causes. The method includes generating a set of cause indices. Each cause index includes a cause, at least one pattern, and a probability of the cause for the pattern. The method also includes receiving a data set, and determining that one or more indexed patterns match a pattern in the data set. Further, the method includes retrieving causes for the indexed patterns that match the pattern in the data set, as well as determining probabilities of the retrieved causes for the pattern in the data set.

11 Claims, 7 Drawing Sheets

(56) References Cited

U.S. PATENT DOCUMENTS

| | | | | |
|---|---|---|---|---|
| 6,499,024 | B1* | 12/2002 | Stier | G06N 5/022 706/50 |
| 6,591,258 | B1* | 7/2003 | Stier | G06N 5/022 706/50 |
| 6,615,367 | B1* | 9/2003 | Unkle | G05B 23/0229 706/46 |
| 9,626,600 | B2* | 4/2017 | Liu | G06F 11/00 |
| 10,063,570 | B2* | 8/2018 | Muddu | H04L 41/145 |
| 10,409,817 | B1* | 9/2019 | Dias | G06F 16/11 |
| 10,637,714 | B2* | 4/2020 | Venkataraman | H04L 41/069 |
| 2003/0070108 | A1* | 4/2003 | Groen | G06F 11/008 714/1 |
| 2004/0002776 | A1* | 1/2004 | Bickford | G05B 23/0254 700/30 |
| 2004/0002994 | A1* | 1/2004 | Brill | G06F 40/232 |
| 2005/0091177 | A1* | 4/2005 | Przytula | G06N 7/005 706/52 |
| 2005/0114298 | A1* | 5/2005 | Fan | G06F 16/2246 |
| 2005/0172162 | A1* | 8/2005 | Takahashi | G06F 11/079 714/4.4 |
| 2007/0043531 | A1* | 2/2007 | Kosche | G06F 11/3471 702/182 |
| 2007/0276631 | A1* | 11/2007 | Subramanian | G06F 11/008 702/186 |
| 2008/0109796 | A1* | 5/2008 | Kosche | G06F 11/3612 717/158 |
| 2008/0114806 | A1* | 5/2008 | Kosche | G06F 11/3495 |
| 2008/0126858 | A1* | 5/2008 | Barras | G06F 11/327 714/25 |
| 2008/0127120 | A1* | 5/2008 | Kosche | G06F 11/3447 717/131 |
| 2008/0127149 | A1* | 5/2008 | Kosche | G06F 8/443 717/158 |
| 2008/0140593 | A1* | 6/2008 | George | G06N 3/049 706/12 |
| 2008/0301597 | A1* | 12/2008 | Chen | G01R 31/31718 716/136 |
| 2009/0265784 | A1* | 10/2009 | Waizumi | H04L 63/1458 726/23 |
| 2011/0154117 | A1* | 6/2011 | Danielson | G06F 11/0748 714/37 |
| 2011/0161274 | A1* | 6/2011 | Gao | G06Q 10/10 706/50 |
| 2011/0172874 | A1* | 7/2011 | Patnaik | G06F 11/008 701/31.4 |
| 2011/0276832 | A1* | 11/2011 | Schneider | G05B 23/0229 714/37 |
| 2011/0295621 | A1* | 12/2011 | Farooq | G16H 10/60 705/3 |
| 2011/0314330 | A1* | 12/2011 | Morimura | G06F 11/2257 714/26 |
| 2012/0102371 | A1* | 4/2012 | Tonouchi | G05B 23/0275 714/49 |
| 2012/0218354 | A1* | 8/2012 | Maekawa | B41J 29/02 347/47 |
| 2012/0246102 | A1* | 9/2012 | Sudharsan | G06N 7/005 706/25 |
| 2013/0117272 | A1* | 5/2013 | Barga | G06F 16/2477 707/741 |
| 2013/0144814 | A1* | 6/2013 | Klinger | G06N 7/005 706/12 |
| 2013/0212257 | A1* | 8/2013 | Murase | H04L 41/0631 709/224 |
| 2013/0218354 | A1* | 8/2013 | San Andres | H02J 13/0006 700/286 |
| 2013/0311481 | A1* | 11/2013 | Bhatt | G06F 16/245 707/741 |
| 2014/0095201 | A1* | 4/2014 | Farooq | G16H 50/30 705/3 |
| 2014/0201133 | A1* | 7/2014 | Kawabata | G06K 9/6296 707/609 |
| 2014/0254772 | A1* | 9/2014 | Williams | H04M 3/24 379/32.01 |
| 2014/0298112 | A1* | 10/2014 | Otsuka | G06F 11/008 714/47.3 |
| 2014/0344186 | A1* | 11/2014 | Nadler | G06Q 10/067 705/36 R |
| 2015/0006471 | A1 | 1/2015 | Przestrzelski et al. | |
| 2015/0081614 | A1* | 3/2015 | Bechet | G06F 11/3692 706/52 |
| 2016/0063072 | A1 | 3/2016 | N et al. | |
| 2016/0258845 | A1* | 9/2016 | Mankovskii | H04L 67/18 |
| 2016/0259869 | A1* | 9/2016 | Parikh | G05B 17/02 |
| 2016/0283304 | A1* | 9/2016 | Horikawa | G06F 11/3409 |
| 2016/0292028 | A1* | 10/2016 | Gamage | G06F 11/0772 |
| 2017/0140384 | A1 | 5/2017 | Zoldi et al. | |
| 2017/0220937 | A1* | 8/2017 | Wada | G06K 9/00 |
| 2017/0322120 | A1* | 11/2017 | Wang | G01M 99/008 |
| 2017/0353362 | A1* | 12/2017 | Harutyunyan | H04L 43/16 |
| 2017/0372212 | A1* | 12/2017 | Zasadzinski | H04L 41/0631 |
| 2018/0114234 | A1* | 4/2018 | Fighel | G06F 40/253 |
| 2018/0174067 | A1* | 6/2018 | Spiro | G06K 9/6253 |
| 2018/0219723 | A1* | 8/2018 | Scarpelli | H04L 41/069 |
| 2018/0267964 | A1* | 9/2018 | Hayashi | G06F 11/076 |
| 2019/0056983 | A1* | 2/2019 | Jeong | G06F 11/0709 |
| 2019/0098032 | A1* | 3/2019 | Murphey | G06F 9/4498 |
| 2019/0138938 | A1* | 5/2019 | Vasseur | H04L 41/147 |
| 2019/0155267 | A1* | 5/2019 | Shin | G06N 20/00 |
| 2019/0228085 | A1* | 7/2019 | Biswas | G06F 11/3476 |
| 2019/0302707 | A1* | 10/2019 | Guo | G06N 3/049 |
| 2020/0084086 | A1* | 3/2020 | Gupta | H04L 41/065 |
| 2020/0104402 | A1* | 4/2020 | Burnett | G06F 16/243 |

OTHER PUBLICATIONS

List of IBM Patents or Patent Applications Treated as Related, Signed Jul. 10, 2019, 2 pages.

Bhavsar et al., "A Weighted-Tree Similarity Algorithm for Multi-Agent Systems in E-Business Environments," Paper prepared for BASeWEB '03, 2003, pp. 1-20.

Xu, H., "An Algorithm for Comparing Similarity Between Two Trees," Thesis, Master of Science in the Department of Computer Science in the Graduate School of Duke University, Apr. 2014, 58 pages. arXiv:1508.03381v1.

Xu, H., "An Algorithm for Comparing Similarity Between Two Trees: Edit Distance with Gaps," Defense Presentation, Apr. 2014, pp. 1-15.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

| Element | Weight |
|---|---|
| 10 | 0.90(1/8) + 0.60(1/6) = 0.2125 |
| 1 | 0.90(1/8) = 0.1125 |
| 5 | 0.90(1/8) = 0.1125 |
| 23 | 0.90(1/8) = 0.1125 |
| 38 | 0.90(1/8) = 0.1125 |
| ... | ... |
| 83 | 0.90(1/8) + 0.60(1/6) = 0.2125 |

| CAUSE | 380 |
|---|---|
| N | 69.8% |

DETERMINING CAUSES OF EVENTS IN DATA

BACKGROUND

The present disclosure relates to big data processing and, more specifically, to determining causes of events associated with data element patterns.

Modern technology frequently uses volumes of data too large and/or complex to be managed by traditional data processing software within reasonable time limits. For example, databases associated with information of interest to an organization (e.g., data relating to health, marketing, finance, weather, social media platforms, search engines, etc.) frequently receive volumes of data ranging from tens of terabytes to hundreds of petabytes or more. Extremely large data sets such as these are known as "big data", and can be computationally analyzed in order to determine patterns, trends, and associations in the data.

SUMMARY

Various embodiments are directed to a method of determining causes. The method can include generating a set of cause indices, which can be multilevel cause indices. Each cause index in the set can include a cause, at least one pattern, and a probability of the cause for the at least one pattern. The method can also include receiving a data set, which can be test data, and determining that one or more indexed patterns match a pattern in the data set that is associated with an event. Determining that an indexed pattern matches the pattern in the data set can include calculating similarity degrees for the pattern in the data set and the indexed pattern, and determining that at least one of the similarity degrees is above a threshold similarity degree. If no similarity degree is above a first threshold similarity degree, the method can include determining that at least one similarity degree is above a second threshold similarity degree. The method can also include retrieving causes for the indexed patterns that match the pattern in the data set, as well as determining probabilities of the retrieved causes for the pattern in the data set. In some embodiments, the method includes ranking the retrieved causes based on the probabilities, selecting at least one cause based on the ranking, and displaying the selected at least one cause on a user interface.

Additional embodiments are directed to a system, which can include at least one processing component, at least one memory component, and a set of cause indices, which can be multilevel cause indices. Each cause index in the set can include a cause, at least one pattern, and a probability of the cause for the at least one pattern. The system can also include a cause determination module configured to a receive a data set, which can be test data. The cause determination module can include a similarity component and a prediction component. The similarity component can determine that one or more patterns indexed in the set of cause indices match a pattern in the data set. In some embodiments, the pattern is associated with an event. Determining that an indexed pattern matches the pattern in the data set can include calculating similarity degrees for the pattern in the data set and the pattern, and determining that at least one of the similarity degrees is above a threshold similarity degree. However, if no similarity degree is above a first threshold similarity degree, the similarity component can determine that at least one similarity degree is above a second threshold similarity degree. The prediction component can retrieve causes for the indexed patterns that match the pattern in the data set, and determine probabilities of retrieved causes for the pattern in the data set. The prediction component can also rank the retrieved causes based on the probabilities, select at least one cause based on the ranking, and display the selected cause on a user interface.

Further embodiments are directed to a computer program product for determining causes, which can include a computer readable storage medium having program instructions embodied therewith, the program instructions executable by a processor to cause the device to perform a method. The method can include generating a set of cause indices, which can be multilevel cause indices. Each cause index in the set can include a cause, at least one pattern, and a probability of the cause for the at least one pattern. The method can also include receiving a data set, and determining that one or more indexed patterns match a pattern in the data set. In some embodiments, the pattern is associated with an event. Determining that an indexed pattern matches the pattern in the data set can include calculating similarity degrees for the pattern in the data set and the pattern, and determining that at least one of the similarity degrees is above a threshold similarity degree. However, if no similarity degree is above a first threshold similarity degree, the method can include determining that at least one similarity degree is above a second threshold similarity degree. The method can also include retrieving causes for the indexed patterns that match the pattern in the data set, as well as determining probabilities of the retrieved causes for the pattern in the data set. In some embodiments, the method includes ranking the retrieved causes based on the probabilities, selecting at least one cause based on the ranking, and displaying the selected at least one cause on a user interface.

DETAILED DESCRIPTION

Data complexity and volume are continuously increasing, at least in part due to the emergence of technologies such as machine learning, mobile devices, social media, and Internet of Things (IoT). Data sets having sizes and/or types that make it impossible or impractical for them to be collected, managed, and processed with low latency by traditional relational databases or other data processing software are referred to as "big data". Big data is characterized by its high volume, velocity, and variety. Organizations can receive, often in real time, structured, semi-structured, and/or unstructured data from a variety of sources (e.g., sensors, devices, video/audio recordings, networks, log files, transactional applications, web, social media, etc.) in volumes currently ranging from terabytes (TB) to zettabytes (ZB). For example, the IoT is expected to generate about 500 ZB of data per year by the end of 2019.

Various data analytics techniques are used to quickly and accurately produce useful information (e.g., patterns, trends, and associations) from the data. Examples of these techniques include predictive, descriptive, and comparative analytics; machine learning; data mining; statistics; text analytics; and natural language processing. However, large volumes of data arriving quickly from a variety of sources can be extremely difficult to analyze at the speeds required by modern technology, particularly when the data is unstructured and/or arriving at irregular intervals. This can result in costly inefficiency and errors.

Disclosed herein are a method and system for determining causes of events associated with patterns in data sets. Examples of events can include problems, failures, specific wanted or unwanted results, anomalies, etc. The most likely causes of events associated with specific patterns in a data set are determined by matching the patterns with patterns indexed by their associated causes in a set of cause indices. An individual cause index includes one or more patterns, as well as the probability of the cause for each of these patterns. Therefore, when a pattern is found to match a pattern in a received data set, likely causes for the new pattern can be easily obtained from the cause index. This increases the efficiency of determining causes of events, which leads to improved data quality, processing speed, and accuracy.

Figure 1:
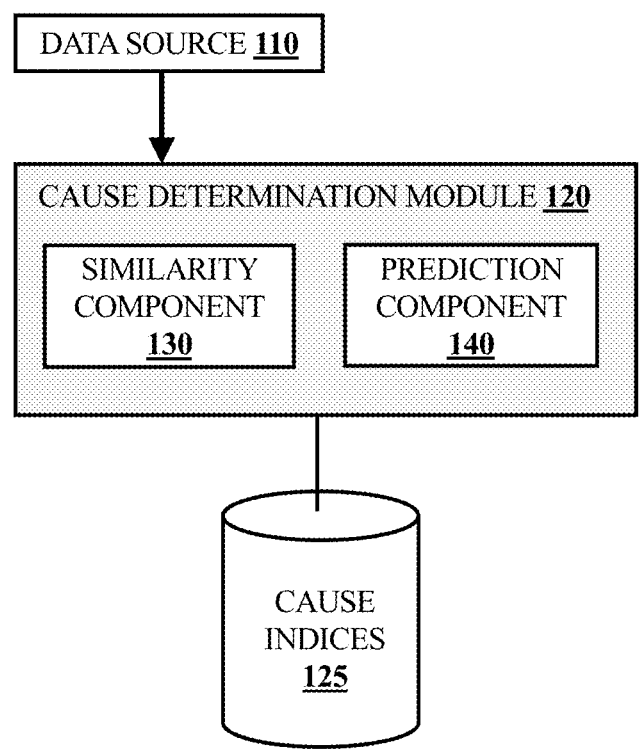
FIG. 1 is a block diagram illustrating an event analysis environment.

FIG. 1 is a block diagram illustrating an event analysis environment 100. The event analysis environment 100 includes a data source 110, a cause determination module 120, and a set of cause indices 125. The cause determination module 120 includes a similarity component 130, and a prediction component 140. Data in the event analysis environment 100 can come from any data source 110. Examples of data sources 110 can include sensors (e.g., sensors in an IoT environment), input/output devices, video/audio recording devices, networks, log files, transactional applications, and/or web sources (e.g., social and professional networking sites, public records databases, video hosting sites, blog hosting sites, online purchase histories, and web browsing histories).

The data source 110 provides data sets having patterns of data elements that as a whole contribute to a particular event (e.g., a problem, a failure, a particular wanted or unwanted result, a transaction, an anomaly, or another event known in the art). These patterns generally include multiple data elements having no specific order (e.g., unstructured data). Examples of unstructured data formats that can be provided by the data source include video/audio data, graphical images, sensor data, text data, streaming data, location coordinates, etc. However, the data source 110 can also provide structured data (e.g., data sets from relational databases, data warehouses, enterprise resource planning (ERP) software, customer relationship management (CRM) software, etc.) and/or semi-structured data (e.g., data sets from comma-separated values (CSV) files, BibTex files, extensible markup language (XML), hypertext markup language (HTML), JavaScript object notation (JSON), etc.) in some embodiments.

The set of cause indices 125 includes causes that index associated patterns of data elements. The probability of the cause is indexed for each pattern as well. An example of a one-level cause index format that can be in the set of cause indices 125 is:

cause i:
{
[key value set A], [candidate value set A], [probability A of cause i]
} where cause i is the cause of an event associated with patterns indexed by the one-level cause index in the set of cause indices 125, key value set A is a common value of the patterns having cause i as their cause, candidate value set A includes remaining values of the patterns having cause i, but which are not included in key value set A, and probability A of cause i is a probability of cause i for a pattern matching key value set A.

The aforementioned cause index includes a single cause (cause i). However, more than one cause may be associated with a pattern leading to an event. In these instances, a pattern can be associated with multiple cause indices in the set of cause indices 125. Additionally, more than one pattern may be associated with one cause. In these instances, multiple patterns may be associated with a single cause index in the set of cause indices 125.

Further, while the aforementioned cause index is a one-level index, multilevel cause indices are included in the set of cause indices 125 in some embodiments. An example of a two-level cause index format is:

cause i:
{
    [key value set A], [candidate value set A], [probability of cause i]
        [key value set B], [candidate value set B], [probability of cause i]
} where cause i is the cause of an event resulting from patterns indexed by the two-level cause index in the set of cause indices 125; key value set A, candidate value set A, and probability A of cause i are as described above with respect to the one-level cause index; key value set B is a subset of candidate value A and a common value of patterns having cause i as their cause, but which are not included in key value set A; candidate value set B is remaining values of the patterns having cause i as their cause, but which are not included in key value set A or key value set B; and probability B of cause i is the probability of cause i for a pattern matching key value set B.

In some embodiments, a multilevel cause index has more than one entry in a level. For example, the aforementioned two-level cause index format can have at least two entries in its second level so that:

cause i:
{
[key value set A], [candidate value set A], [probability of cause i],
    [key value set B], [candidate value set B], [probability of cause i],
    [key value set B'], [candidate value set B'], [probability B' of cause i],
    ...
} where cause i is the cause of an event resulting from patterns indexed by the two-level cause index in the set of cause indices 125; key value set A, candidate value set A, probability A of cause i, key value set B, candidate value set B, and probability B of cause i are as described above with respect to the two-level cause index; key value set B' is a subset of candidate value A and a common value of patterns having cause i as their cause, but which are not included in key value set A or key value set B; candidate value set B' is remaining values of the patterns with cause i as their cause, but which are not included in key value set A or key value set B', and probability B' of cause i is the probability of cause i for a pattern matching key value set B'. The ellipses represent any additional items in second level of the cause index.

One illustrative example of a cause index that can be in the set of cause indices 125 includes four patterns indexed by cause A:

Pattern 1: [1, 2, 3, 4, 5, 6, 7, 8, 9, 10, 11, 12]
Pattern 2: [1, 2, 3, 4, 5, 6, 7, 8, 9, 10, 13, 14]
Pattern 3: [1, 2, 3, 4, 5, 6, 7, 8, 9, 10, 15, 16]
Pattern 4: [11, 12, 17, 18]

In some embodiments, the cause index organizes the four patterns using two one-level index items:

cause A:
{[1, 2, 3, 4, 5, 6, 7, 8, 9, 10], [11, 12, 13, 14, 15, 16], [77.59%]}
{[11, 12], [1, 2, 3, 4, 5, 6, 7, 8, 9, 10, 17, 18], [42.78%]} where the first item indexes patterns 1, 2, and 3, and the second item indexes patterns 1 and 4. In other embodiments, the cause index organizes the four patterns with one two-level index item:

cause A:
{[1, 2, 3, 4, 5, 6, 7, 8, 9, 10], [11, 12, 13, 14, 15, 16], [77.59%],
[11, 12], [17, 18], [42.78%]} where the first level indexes patterns 1, 2, and 3, and the second level indexes patterns 1 and 4. The one-level index for cause A includes two index items, while the two-level index for cause A includes only one index item. Therefore, the total number of index items in the set of cause indices 125 can be reduced by using multilevel indices.

Received data sets are compared to the patterns indexed in the set of cause indices 125 by the similarity component 130, which calculates degrees of similarity between patterns in the data sets and indexed patterns. The similarity component 130 can use a variety of techniques known in the art (e.g., tree similarity algorithms, MostFreqKDistance, fuzzy similarity, Wagner-Fischer algorithm, Hirschberg's algorithm, etc.) to determine the similarity degrees. Examples of similarity metrics can include tree edit distance, graph edit distance, Hamming distance, Jaro-Winkler distance, Levenshtein distance, frequent k similarity, etc. When a degree of similarity between an indexed pattern and a pattern in the received data set is determined to be above a threshold similarity degree, the patterns are considered a match. In some embodiments, the similarity component 130 uses more than one threshold similarity degree to determine whether there is a matching pattern.

Figure 3A:
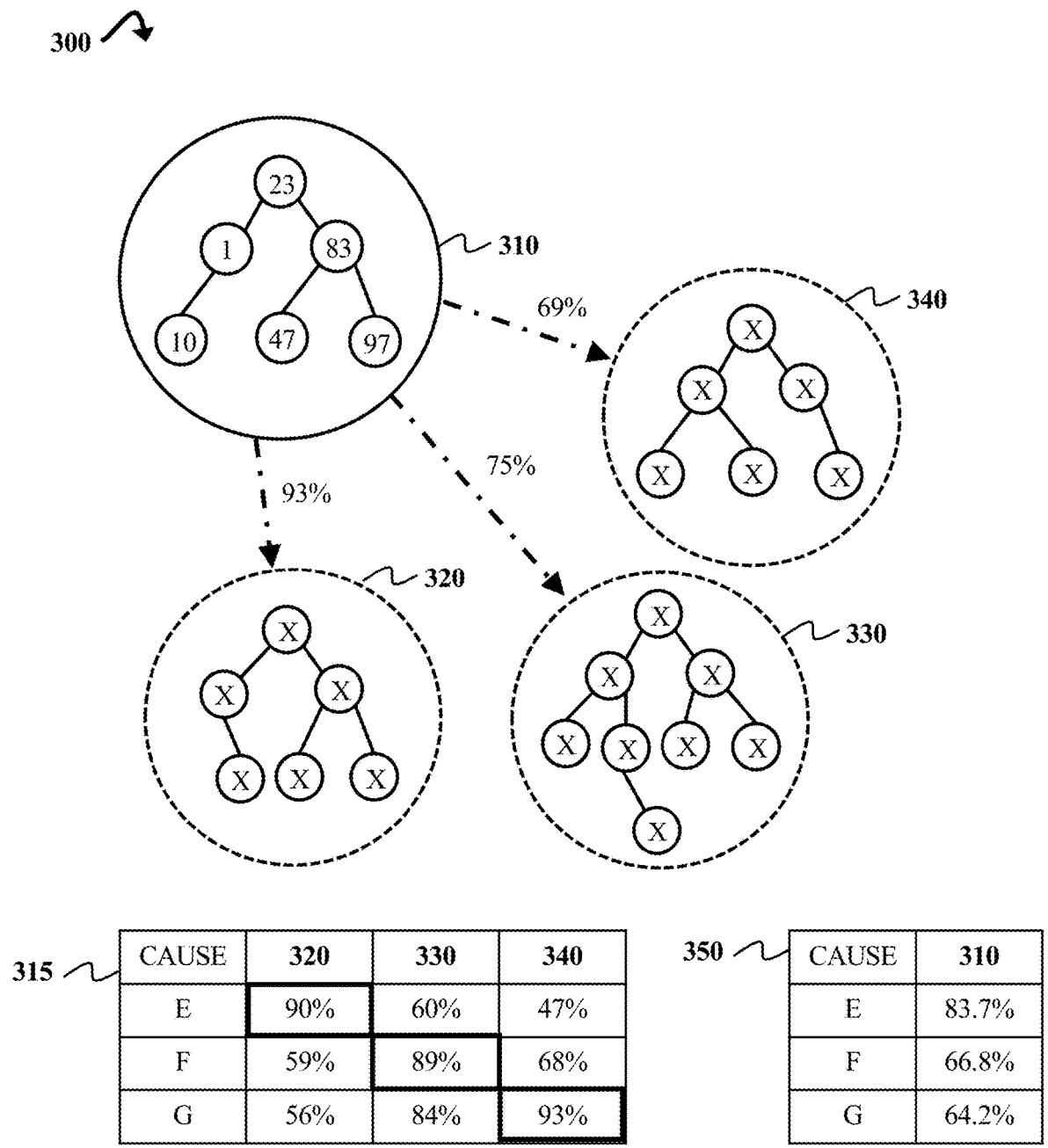
FIG. 3A is a schematic diagram illustrating a determination of a most likely cause of an event associated with a received data set, according to some embodiments of the present disclosure.
Figure 3B:
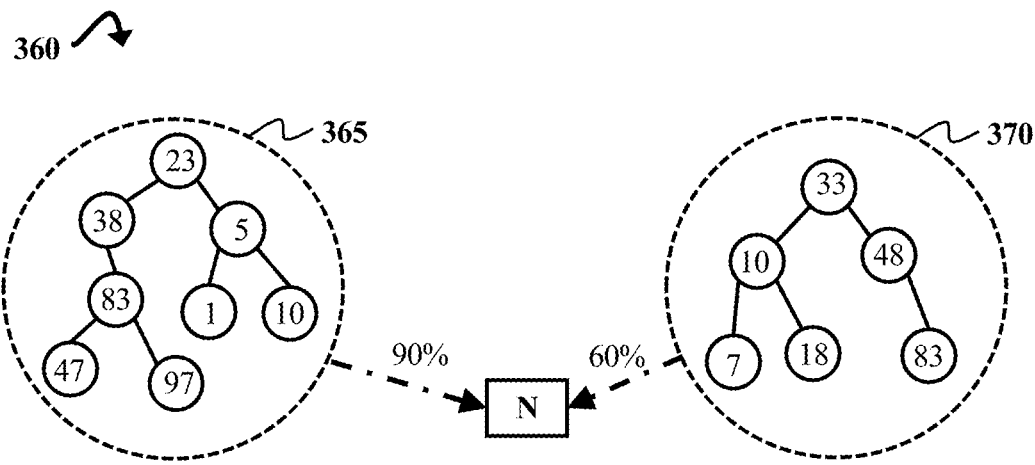
FIG. 3B is a schematic diagram illustrating a determination of the probability of a cause for a received data set pattern, according to some embodiments of the present disclosure.
Figure 3B:
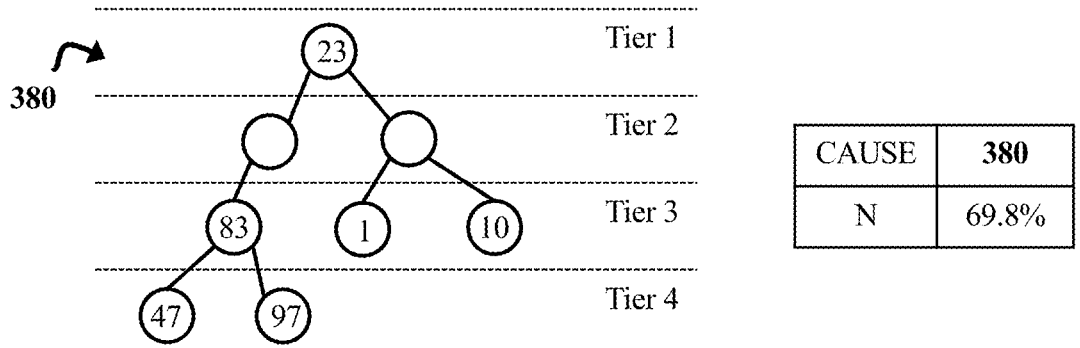

The prediction component 140 determines the most likely cause of an event associated with a pattern in a received data set. From the set of cause indices 125, the prediction component 140 retrieves at least one cause index that includes a pattern matching the pattern in the data set. The prediction component 140 also determines which causes from retrieved cause indices are most likely to be the cause of the event in the received data set based on the similarity degrees of the matching patterns and the probabilities in the cause indices. Examples involving these determinations are illustrated in FIGS. 3A and 3B.

Figure 2:
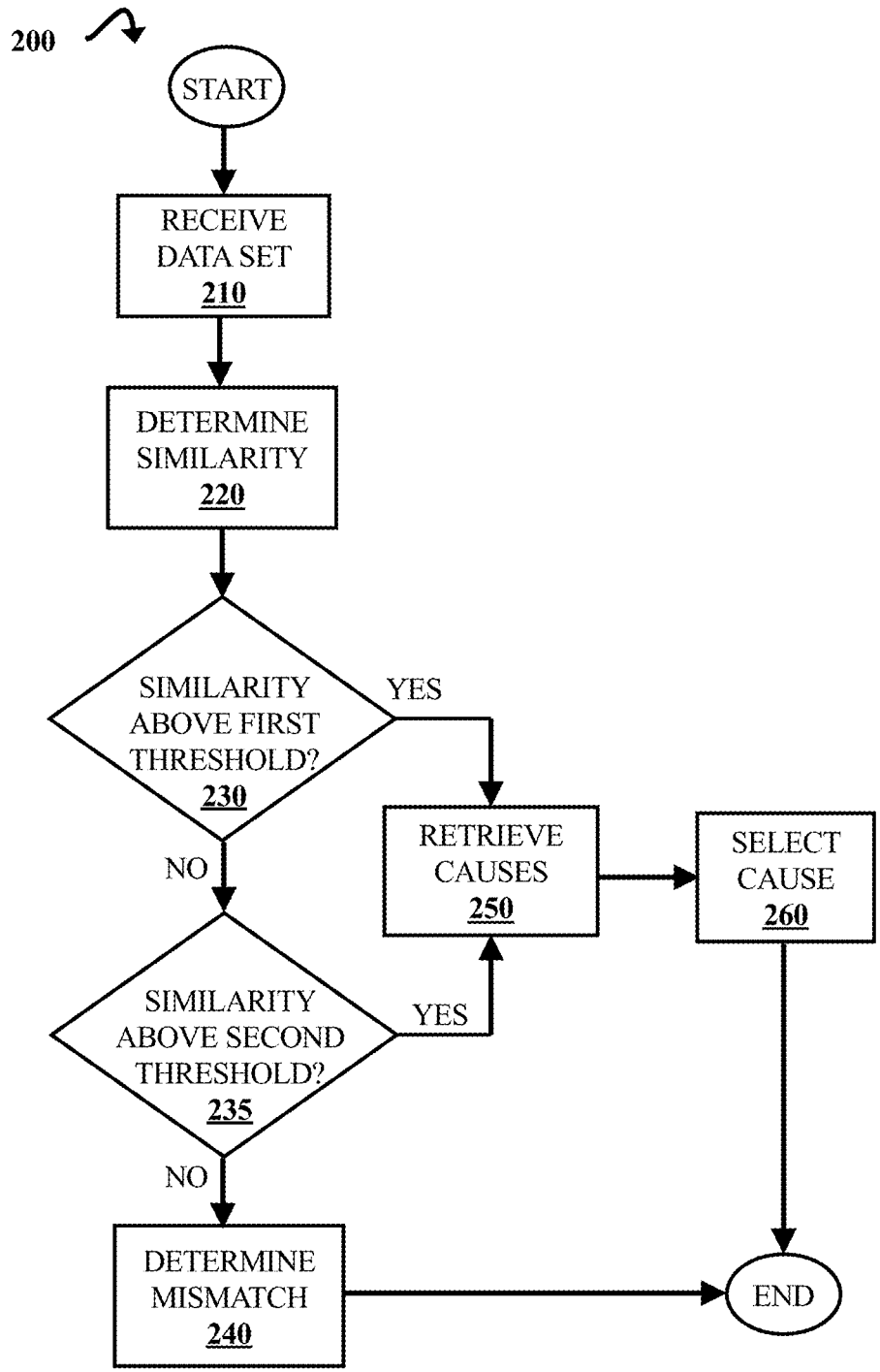
FIG. 2 is a flow diagram illustrating a process of determining a cause of an event associated with a pattern in a received data set, according to some embodiments of the present disclosure.

FIG. 2 is a flow diagram illustrating a process 200 of determining a cause of an event associated with a pattern in a received data set, according to some embodiments of the present disclosure. To illustrate process 200, but not to limit embodiments, FIG. 2 is described within the context of cause determination environment 100 of FIG. 1. Where elements described with respect to FIG. 2 are identical to elements shown in FIG. 1, the same reference numbers are used in both Figures.

A data set from the data source 110 is received by the cause determination module 120. This is illustrated at step 210. In some embodiments, the data set is entered automatically (e.g., received from a device or network), though the data set can also be entered by a user. In a simplified conceptual example, a big data set with numerous scheduled test cases is received by the cause determination module 120. The data set can include at least one event (e.g., a test case failure and/or variation) having one or more unknown causes (e.g., defects and/or root causes of test case failures). Each event is associated with a pattern of data elements in the data set, referred to herein as a "data set pattern".

The similarity component 130 determines degrees of similarity between patterns in the set of cause indices 125 and a data set pattern in the received data set. This is illustrated at step 220. It should be noted that, while a single data set pattern is described with respect to FIG. 2, process 200 is generally carried out multiple times for each received data set (e.g., for all patterns associated with events in the received data set). Similarity degree metrics can include tree edit distance, graph edit distance, Hamming distance, Jaro-Winkler distance, Levenshtein distance, frequent k similarity. Examples of algorithms that can be used by the similarity component 130 to calculate similarity degrees are discussed in greater detail with respect to FIG. 1.

The similarity component 130 then determines whether there are patterns indexed in the set of cause indices 125 that match the received data set pattern. This is illustrated at step 230. If one or more indexed patterns are determined to have degrees of similarity to the data set pattern that are above first threshold degrees of similarity, the indexed patterns are considered matches. The threshold similarity degrees can be preset and/or input by a user. In some embodiments, the threshold can be adjusted based on user preference. The threshold similarity degrees can be presented numerically (e.g., edit distance or percent similarity) or as threshold levels. For example, a user could select between levels one and two, where level one has a higher threshold similarity degree than level two. The threshold levels can be expressed in a variety of ways, and can be selected or entered using input controls in a user interface. In some embodiments, the threshold levels can be expressed as words, letters, percentages, numbers, colors, and/or icons.

If no matching indexed patterns are found at step 230, the similarity component 130 can optionally use a second threshold similarity degree to determine whether there are lower-similarity pattern matches. This is illustrated at step 235. The second threshold similarity degree is lower than the first threshold similarity degree. In some embodiments, three or more threshold similarity degrees can be used to locate indexed patterns matching the data set pattern with decreasing degrees of similarity. However, process 200 uses only one threshold similarity degree in some embodiments, omitting step 235. The number of thresholds can be preset and/or selected by a user via a user interface.

If no indexed patterns matching the data set pattern are found at steps 230 and/or 235, the data set pattern is determined to be a mismatch. This is illustrated at step 240. In some embodiments, the data set pattern is tagged as mismatched. A user interface can also display a label for an event associated with the data set pattern indicating that there is no match or that the cause is unknown. The user can then determine whether to take further action (e.g., adjust the threshold similarity degree, select additional thresholds, investigate the event using other methods, ignore the event, etc.). In some embodiments, these actions are automated.

However, if at least one indexed pattern matching the received data set pattern is found at step 230 or 235, the prediction component 140 retrieves cause indices that include the matching indexed pattern or patterns from the set of cause indices 125. This is illustrated at step 250. Retrieving only the cause indices with matching patterns is a faster way of locating possible causes of an event associated with the data set pattern than searching an entire set of causes for every data set pattern associated with an event. Narrowing the selection of possible causes allows the most likely cause to be determined more efficiently in subsequent steps.

The prediction component 140 sorts the retrieved causes, and selects a most likely cause of the event associated with the received data set pattern. This is illustrated at step 260. For example, there may be five indexed patterns matching the data set pattern. The patterns can be indexed by three cause indices A, B, and C, which are retrieved by the prediction component 140. The probabilities of causes A, B, and C can be different for each of the indexed patterns. The prediction component 140 determines, based on the degrees of similarity and the indexed probabilities, the probability of each cause for the data set pattern. The causes are sorted by probability, and the cause or causes with the highest probability of being the cause of the event associated with the data set pattern are selected. Examples of cause selection are discussed in greater detail with respect to FIGS. 3A and 3B.

A user is optionally notified of the most likely cause or causes determined at step 260. For example, the user can be prompted to investigate the most likely cause. In some embodiments, each cause above a threshold probability is displayed on a user interface as a possible cause (e.g., all causes with a probability higher than 75%). Causes can be displayed in order of probability (e.g., the cause with the highest probability or the causes with the five highest probabilities). In some embodiments, automated actions can be taken based on the cause determination, optionally without notifying the user.

In addition, if the most likely cause is investigated and it is confirmed to be the cause of the event associated with the data set pattern, the probability of the cause for the received data set pattern can be changed to 100%. For example, the user can confirm the cause via a user interface, or the probability can be automatically updated. The received data set pattern and new probability are saved in the set of cause indices 125, thereby increasing the accuracy and efficiency of the cause determination module.

FIG. 3A is a schematic diagram 300 illustrating a determination of the most likely cause of an event associated with a received data set, according to some embodiments of the present disclosure. To illustrate diagram 300, but not to limit embodiments, FIG. 3A is described within the context of cause determination environment 100 of FIG. 1 and process 200 of FIG. 2. Where elements described with respect to FIGS. 1 and 2 are identical to elements in FIG. 3A, the same reference numbers are used in both Figures.

The received data set includes a pattern 310 of six elements (23, 1, 83, 10, 47, 97) associated with an event. At steps 220, 230, and optionally 235, the similarity component 130 determines that three patterns in the set of cause indices 125 match data set pattern 310. The similarity degrees for the patterns are represented by percent similarities next to the respective arrows in FIG. 3A. Indexed pattern 320 has a 93% similarity to data set pattern 310, indexed pattern 330 has a 75% similarity to data set pattern 310, and indexed pattern 340 has a 69% similarity to data set pattern 310.

The prediction component 140 retrieves cause indices that include patterns 320, 330, and 340 from the set of cause indices 125 at step 250. Indices for three causes E, F, and G are retrieved, and each index includes patterns 320, 330, and 340. Table 315 illustrates probabilities of causes E, F, and G for indexed patterns 320, 330, and 340. In table 315, the highest probability calculated for each indexed pattern 320, 330, and 340 is surrounded by a bold line. The probability of cause E is highest for the first indexed pattern 320 (90% probability), the probability of cause F is highest for the second indexed pattern 330 (89% probability), and the probability of cause G is highest for the third indexed pattern 330 (93% probability).

If data set pattern 310 exactly matched one of indexed patterns 320, 330, or 340 (e.g., had a 100% similarity degree), it would have the same probability of being associated with each cause as the exactly matching indexed pattern. For example, if data set pattern 310 were 100% similar to indexed pattern 320, the probabilities of an event associated with data set pattern 310 being caused by causes E, F, and G would be 90%, 59% and 56%, respectively (see table 315). However, indexed patterns 320, 330, and 340 are not exact matches for data set pattern 310. Instead, indexed patterns 320, 330, and 340 are considered matches for pattern 310 because their similarity degrees are above a threshold similarity degree. Therefore, the prediction component 140 takes the similarity degrees into account when determining the cause of the event associated with data set pattern 310.

For example, multiplying the highest probabilities of each cause for indexed patterns 320, 330, or 340 (surrounded by bold lines in table 315) by the similarity degrees for the respective indexed patterns 320, 330, and 340 and data set pattern 310 provides probabilities of each cause being associated with data set pattern 310. FIG. 3A illustrates the probabilities of E, F, and G for data set pattern 310 in a ranked list 350. The ranked list 350 indicates that cause E has the highest probability (83.7%) of causing the event associated with data set pattern 310. Therefore, at step 260, cause E can be selected as the most likely cause of an event associated with data set pattern 310.

FIG. 3B is a schematic diagram 360 illustrating the determination of the probability of a cause for a received data set pattern, according to some embodiments of the present disclosure. To illustrate diagram 360, but not to limit embodiments, FIG. 3B is described within the context of cause determination environment 100 of FIG. 1 and process 200 of FIG. 2. Where elements described with respect to FIGS. 1 and 2 are identical to elements in FIG. 3B, the same reference numbers are used in both Figures.

The example illustrated in FIG. 3B includes two patterns 365 and 370 in a set of cause indices 125. Both patterns 365 and 370 are indexed by cause N, and the probabilities of cause N for patterns 365 and 370 are 90% and 60%, respectively. In order to determine probabilities of cause N for new patterns with data elements in common, the weights of data elements in patterns 365 and/or 370 are determined.

Table 375 illustrates sample weight calculations for these data elements. Indexed pattern 365 includes a total of eight data elements (1, 10, 5, 23, 38, 83, 47, and 97), and indexed pattern 370 includes a total of six data elements (83, 48, 33, 10, 7, and 18). Elements 10 and 83 appear in both patterns 365 and 370, giving them higher weights than the other elements. The weight calculations also take into account the probabilities of cause N for patterns 365 and 370. Cause N has a higher probability for pattern 365 than pattern 370, which raises the weights of elements in pattern 365 (weight=0.11) relative to those in pattern 370 (weight=0.10). Table 375 illustrates sample weight calculations for data elements appearing only in pattern 365 and elements appearing in both patterns 365 and 370 (weight=0.21). The ellipses represent substantially similar calculations for the remaining elements left out of the table.

The similarity component 130 determines that pattern 365 matches a received data set pattern 380 having elements 1, 10, 23, 83, 47, and 97 (e.g., at steps 220 and 230 of process 200). Therefore, the prediction component 140 retrieves cause N from the set of cause indices 125 (e.g., at step 250 of process 200). However, patterns 380 and 365 are not a 100% match. Comparing data set pattern 380 to indexed pattern 365 shows that data set pattern 380 does not include elements 5 and 38 (Tier 2), which are present in pattern 365. Therefore, when calculating the probability of cause N for pattern 380, the probability of cause N for pattern 365 (90% probability) is adjusted to account for the weights of the missing data elements. In the cause index for cause N, elements 5 and 38 are present in pattern 365, but not pattern 370, and thus each have weights of 0.1125 (see table 375). Therefore, in this example, the probability of cause N for data set pattern 380 is 69.8% (probability of cause N=0.90 [1-2(0.1125)]).

If other cause indices from the set of cause indices 125 have patterns matching data set pattern 380, the prediction component 140 retrieves these cause indices as well, and carries out similar calculations to those of cause N for each cause in the retrieved indices. The prediction component 140 then selects the most likely cause or causes based on the calculated probabilities (e.g., at step 260 of process 200). A user can then be notified of the most likely causes. For example, if cause N is the most likely cause, the user can be prompted to investigate cause N. If the user then determines that cause N is in fact the cause of an event associated with data set pattern 380, the user can enter the information into a user interface, updating the probability of cause N for pattern 380 to 100%. The set of cause indices 125 can also save pattern 380 and the corresponding probability 100% in the cause index for cause N, which will increase the weight of elements in pattern 380. Updating the set of cause indices 125 based on new data allows the accuracy and efficiency of cause searching to continuously increase.

Figure 4:
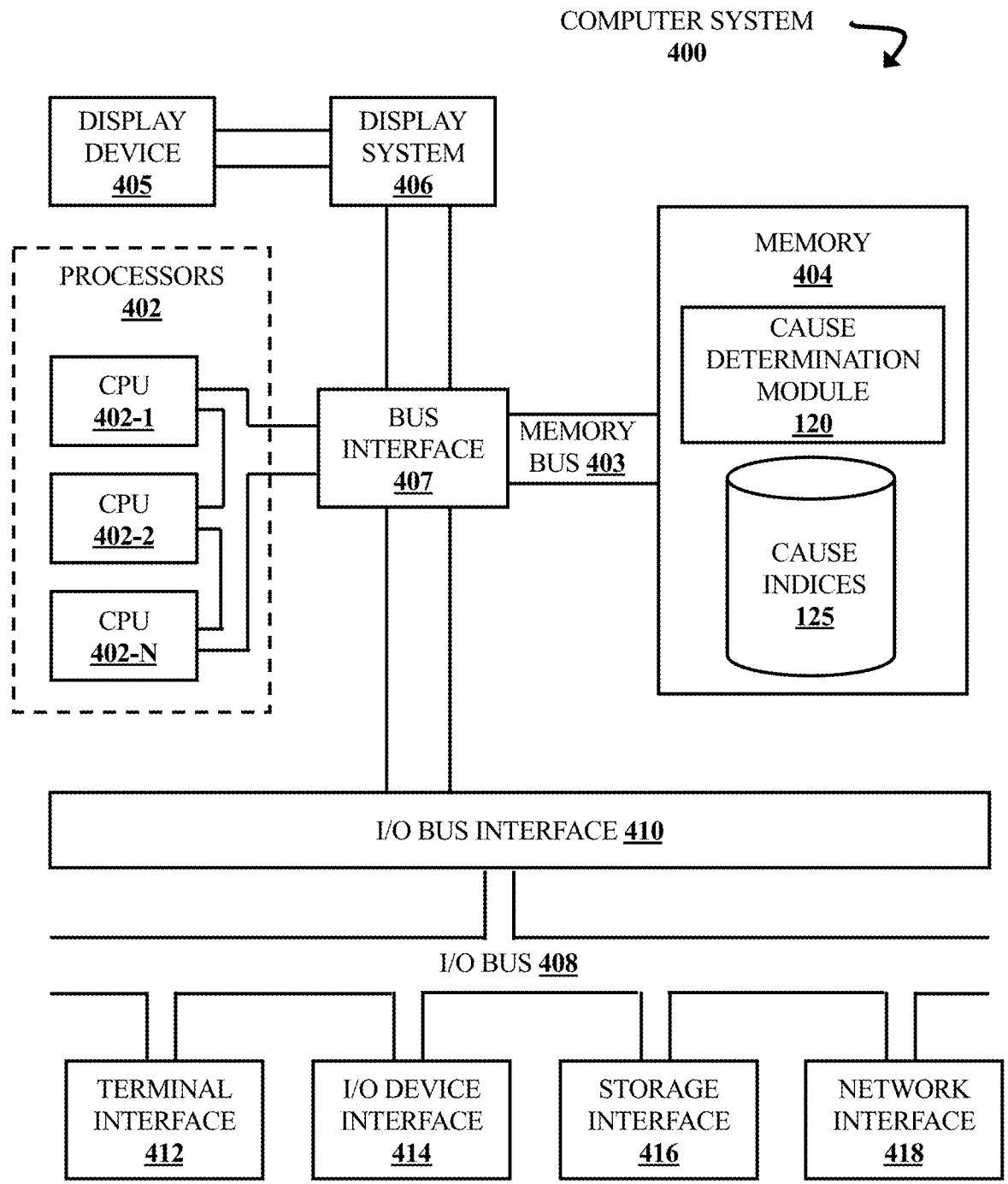
FIG. 4 is a block diagram illustrating a computer system, according to some embodiments of the present disclosure.

FIG. 4 is a high-level block diagram illustrating an exemplary computer system 400 that can be used in implementing one or more of the methods, tools, components, and any related functions described herein (e.g., using one or more processor circuits or computer processors of the computer). In some embodiments, the major components of the computer system 400 comprise one or more processors 402, a memory subsystem 404, a terminal interface 412, a storage interface 416, an input/output device interface 414, and a network interface 418, all of which can be communicatively coupled, directly or indirectly, for inter-component communication via a memory bus 403, an input/output bus 408, bus interface unit 407, and an input/output bus interface unit 410.

The computer system 400 contains one or more general-purpose programmable central processing units (CPUs) 402-1, 402-2, and 402-N, herein collectively referred to as the CPU 402. In some embodiments, the computer system 400 contains multiple processors typical of a relatively large system; however, in other embodiments the computer system 400 can alternatively be a single CPU system. Each CPU 402 may execute instructions stored in the memory subsystem 404 and can include one or more levels of on-board cache.

The memory 404 can include a random-access semiconductor memory, storage device, or storage medium (either volatile or non-volatile) for storing or encoding data and programs. In some embodiments, the memory 404 represents the entire virtual memory of the computer system 400, and may also include the virtual memory of other computer systems coupled to the computer system 400 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 404 also contains a set of cause indices 125 and a cause determination module 120.

These components are illustrated as being included within the memory 404 in the computer system 400. However, in other embodiments, some or all of these components may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Thus, though the cause determination module 120 and cause indices 125 are illustrated as being included within the memory 404, components of the memory 404 are not necessarily all completely contained in the same storage device at the same time. Further, although these components are illustrated as being separate entities, in other embodiments some of these components, portions of some of these components, or all of these components may be packaged together.

In an embodiment, the cause determination module 120 includes instructions that execute on the processor 402 or instructions that are interpreted by instructions that execute on the processor 402 to carry out the functions as further described in this disclosure. In another embodiment, the cause determination module 120 is implemented in hardware via semiconductor devices, chips, logical gates, circuits, circuit cards, and/or other physical hardware devices in lieu of, or in addition to, a processor-based system. In another embodiment, the cause determination module 120 includes data in addition to instructions.

Although the memory bus 403 is shown in FIG. 4 as a single bus structure providing a direct communication path among the CPUs 402, the memory subsystem 410, the display system 406, the bus interface 407, and the input/output bus interface 410, the memory bus 403 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 410 and the input/output bus 408 are shown as single respective units, the computer system 400 may, in some embodiments, contain multiple input/output bus interface units 410, multiple input/output buses 408, or both. Further, while multiple input/output interface units are shown, which separate the input/output bus 408 from various communications paths running to the various input/output devices, in other embodiments some or all of the input/output devices may be connected directly to one or more system input/output buses.

The computer system 400 may include a bus interface unit 407 to handle communications among the processor 402, the memory 404, a display system 406, and the input/output bus interface unit 410. The input/output bus interface unit 410 may be coupled with the input/output bus 408 for transferring data to and from the various input/output units. The input/output bus interface unit 410 communicates with multiple input/output interface units 412, 414, 416, and 418, which are also known as input/output processors (IOPs) or input/output adapters (IOAs), through the input/output bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 is a multi-user mainframe computer system, a single-user system, or a server computer or similar device that has little or no direct user interface, but receives requests from other computer systems (clients). Further, in some embodiments, the computer system 400 is implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, Components other than or in addition to those shown in FIG. 4 may be present, and the number, type, and configuration of such components may vary.

In some embodiments, the data storage and retrieval processes described herein could be implemented in a cloud computing environment, which is described below with respect to FIGS. 5 and 6. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
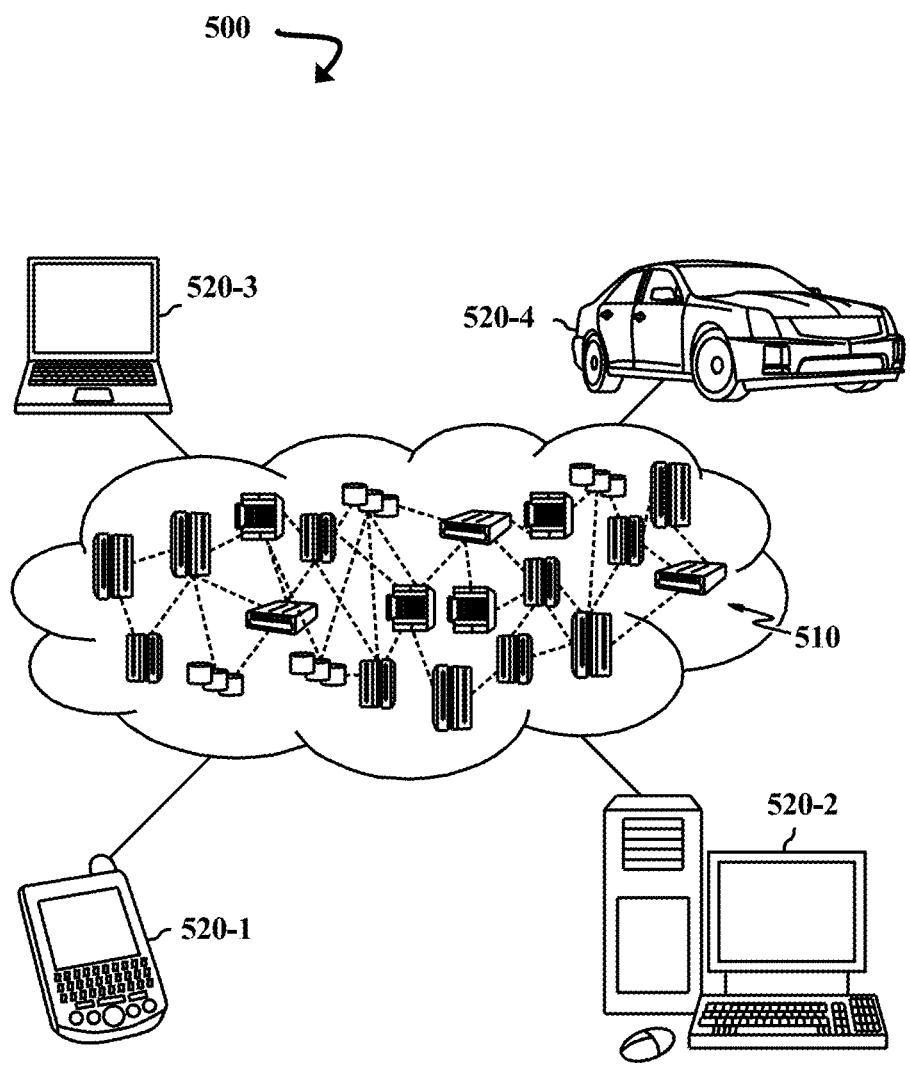
FIG. 5 is a block diagram illustrating a cloud computing environment, according to some embodiments of the present disclosure.

FIG. 5 is a block diagram illustrating a cloud computing environment 500, according to some embodiments of the present disclosure. As shown, cloud computing environment 500 includes one or more cloud computing nodes 510 with which local computing devices used by cloud consumers, such as, for example, personal digital assistant (PDA) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1-520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
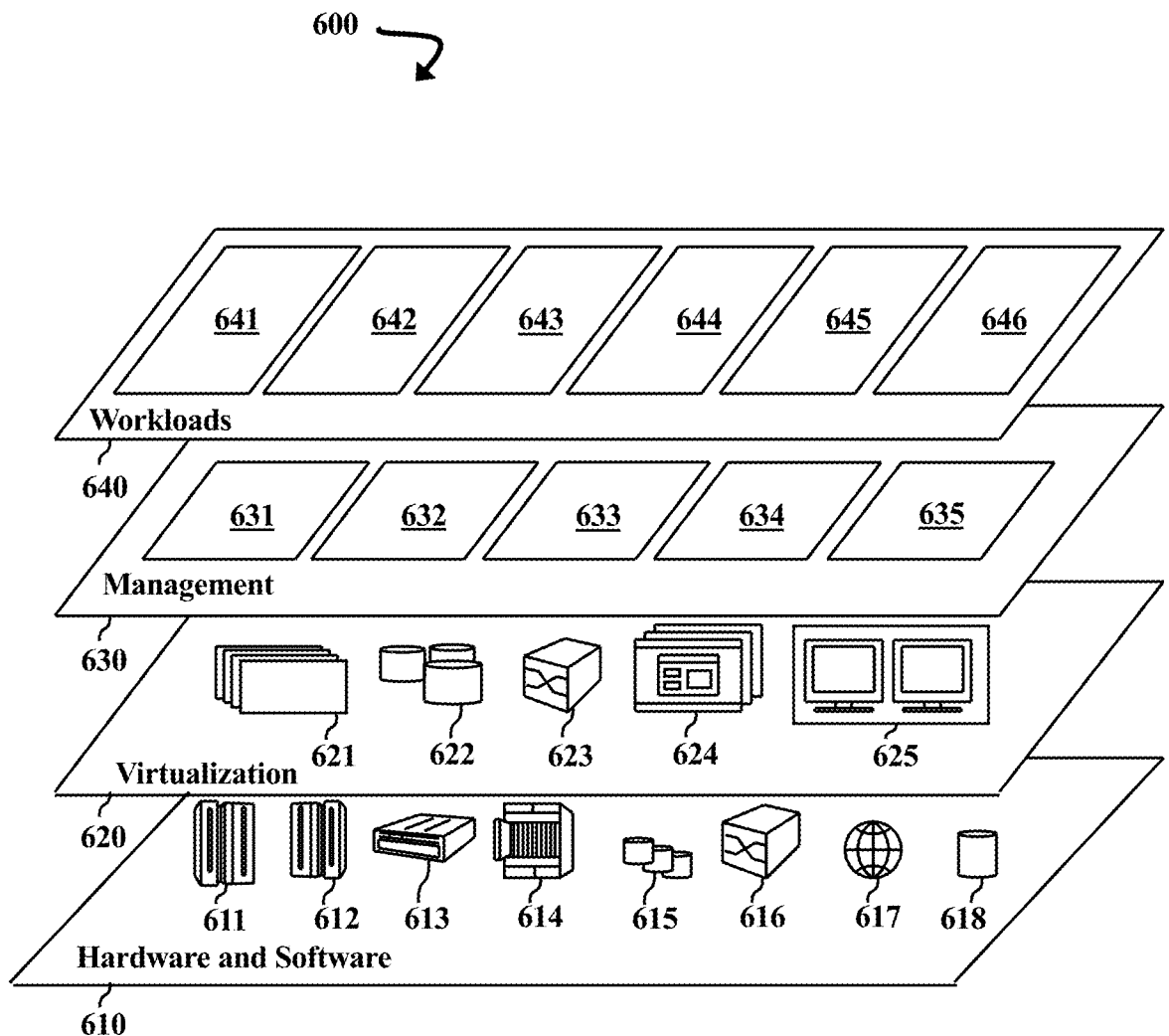
FIG. 6 is a block diagram illustrating a set of functional abstraction model layers provided by the cloud computing environment, according to some embodiments of the present disclosure.

FIG. 6 is a block diagram illustrating a set of functional abstraction model layers 600 provided by the cloud computing environment 500, according to some embodiments of the present disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 provides the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (SLA) planning and fulfillment 635 provide pre-arrangement for, and procurement of, cloud computing resources for which a future requirement is anticipated in accordance with an SLA.

Workloads layer 640 provides examples of functionality for which the cloud computing environment can be utilized. Examples of workloads and functions that can be provided from this layer include: mapping and navigation 641; software development and lifecycle management 642; virtual classroom education delivery 643; data analytics processing 644; transaction processing 645; and determining causes of events in data sets 646.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system, comprising:
  a memory; and
  a processor communicatively coupled to the memory, wherein the processor is configured to:
    generate cause indices, wherein for each of the cause indices, the generating comprises:
      retrieving a cause of a previous event;
      indexing, with the cause of the previous event, patterns of data elements that contributed to the previous event;
      indexing, with the cause of the previous event, a key value set comprising common values from the contributing patterns; and
      indexing, with the cause of the previous event, a probability of the cause of the previous event for a pattern of data elements matching the key value set;
    receive a new pattern of data elements;
    retrieve, from the cause indices, causes indexed with patterns matching the new pattern, wherein the retrieved causes are selected based on similarity degrees between the new pattern and key value sets indexed with the retrieved causes;
    rank the retrieved causes according to probabilities indexed with the retrieved causes; and
    select, as a cause of an event associated with the new pattern, a highest ranking cause from the retrieved causes; and
    display the selected cause on a user interface;

wherein at least one of the cause indices comprise a two-level cause index having a first level and a second level, wherein the two-level index is organized by the format:

```
cause i:
{
    [key value set A], [candidate value set A], [probability A of cause i],
    [key value set B], [candidate value set B], [probability B of cause i]
}
``` and wherein:
cause i is the cause of the previous event;
in the first level, key value set A is common values from a group of patterns contributing to the cause i, candidate value set A is remaining values from the group of patterns that are not included in key value set A, and probability A of cause i is a probability of cause i for a pattern matching key value set A; and
in the second level, key value set B is common values from a subset of candidate value set A, candidate value set B is remaining values from the group of patterns contributing to the cause i that are not included in key value set A or key value set B, and probability B of cause i is a probability of cause i for a pattern matching key value set B.

2. The system of claim 1, wherein the similarity degrees between the new pattern and the key value sets indexed with the retrieved causes are above a threshold similarity degree.

3. The system of claim 1, wherein the processor is further configured to:
determine that none of the similarity degrees is above a first threshold similarity degree; and
determine that at least one of the similarity degrees is above a second threshold similarity degree.

4. The system of claim 1, wherein the data elements in the new pattern comprise test data.

5. A computer program product for determining causes, the computer program product comprising a computer readable storage medium having program instructions embodied therewith, the program instructions executable by a processor to cause a device to perform a method, the method comprising:
generating cause indices, wherein for each of the cause indices, the generating comprises:
retrieving a cause of a previous event;
indexing, with the cause of the previous event, patterns of data elements that contributed to the previous event;
indexing, with the cause of the previous event, a key value set comprising common values from the contributing patterns; and
indexing, with the cause of the previous event, a probability of the cause of the previous event for a pattern of data elements matching the key value set;
receiving a new pattern of data elements;
retrieving, from the cause indices, causes indexed with patterns matching the new pattern, wherein the retrieved causes are selected based on similarity degrees between the new pattern and key value sets indexed with the retrieved causes;

ranking the retrieved causes according to probabilities indexed with the retrieved causes; and
selecting, as a cause of an event associated with the new pattern, a highest ranking cause from the retrieved causes; and
displaying the selected cause on a user interface;
wherein at least one of the cause indices comprise a two-level cause index having a first level and a second level, wherein the two-level index is organized by the format:

```
cause i:
{
    [key value set A], [candidate value set A], [probability A of cause i],
    [key value set B], [candidate value set B], [probability B of cause i]
}
``` and wherein:
cause i is the cause of the previous event;
in the first level, key value set A is common values from a group of patterns contributing to the cause i, candidate value set A is remaining values from the group of patterns that are not included in key value set A, and probability A of cause i is a probability of cause i for a pattern matching key value set A; and
in the second level, key value set B is common values from a subset of candidate value set A, candidate value set B is remaining values from the group of patterns contributing to the cause i that are not included in key value set A or key value set B, and probability B of cause i is a probability of cause i for a pattern matching key value set B.

6. The computer program product of claim 5, wherein the similarity degrees between the new pattern and the key value sets indexed with the retrieved causes are above a threshold similarity degree.

7. The computer program product of claim 5, wherein the retrieving the causes comprises:
determining that none of the similarity degrees is above a first threshold similarity degree; and
determining that at least one of the similarity degrees is above a second threshold similarity degree.

8. The computer program product of claim 5, wherein for each of the cause indices, the generating further comprises indexing, with the cause of the previous event, a candidate value set comprising remaining values from the contributing patterns that are not in the key value set.

9. The computer program product of claim 5, wherein for each of the cause indices, the generating further comprises:
generating a first level of a cause index for the cause of the previous event, wherein the first level includes at least one of the contributing patterns and the probability.

10. The computer program product of claim 5, wherein a pattern from the contributing patterns is indexed by more than one of the cause indices.

11. The computer program product of claim 5, wherein at least one of the cause indices comprise two one-level index items.

* * * * *